United States Patent Office 3,447,098
Patented May 27, 1969

3,447,098
GAS LASER TUBE SYSTEM
Edwin E. Eckberg, P.O. Box 331, 391 Davis Road,
Bedford, Mass. 01730
Filed Feb. 8, 1966, Ser. No. 528,332
Int. Cl. H01s 3/22
U.S. Cl. 331—94.5    1 Claim

ABSTRACT OF THE DISCLOSURE

A new gas laser tube system with self-contained optics which are self-aligning is described. The system accommodates severe thermal or mechanical stresses which do not disrupt the laser beam. Also contained are the gas excitation electrodes and their respective glass-to-metal sealed feedthrough terminals. The latter protrude through the laser envelope for electrical power input connection. Either the visible (6,328 AU) or the infrared can be produced. One modification allows low voltage operation of the device. This new laser design includes considerations which embrace: scientific glassblowing; optical surface grinding and polishing; geometric-optics; thin-film depositions; and, ultrahigh purification and evacuation. Power output data are not complete but the new laser system compares well with the output of either plano-to-plano, or confocal, laser tube design. A so-called corner-cube ("Hollowed Corner of a Cube") is used at one or both ends of the new design, inside the envelope. Borosilica glass is used entirely, excepting in those cases of the infrared type, the latter necessitating a suitable transmitting material for the beam exit (window).

---

My invention relates to improvements in gas laser tube devices and more particularly to a multiple purpose gas laser tube system capable of laser beam generation and operation in use as may be propagated by one of several methods of excitation of the contained gases, also a gas laser tube system which is not generally affected by thermal or mechanical stress, and one which includes an optical arrangement such that the critical and the necessary parallelism of the present-day state of the art gas laser devices, usually having two end-reflectors, is eliminated.

The objects of my invention are to present a gas laser tube system which may be considered as self-aligning, optically, stable and persistent with respect to the generation of the laser beam, and possess an overall efficiency which approximates a minimum of ten times the efficiency of present state of the art gas laser tube devices. Also, a gas laser tube system which will have a self-sustaining ionic gaseous discharge and subsequent laser beam generation at impressed potential starting and operating voltages which are normal to available and standard line power. These and other objects will present themselves and become apparent from my specifications and the appended drawings in which:

Figure 1:
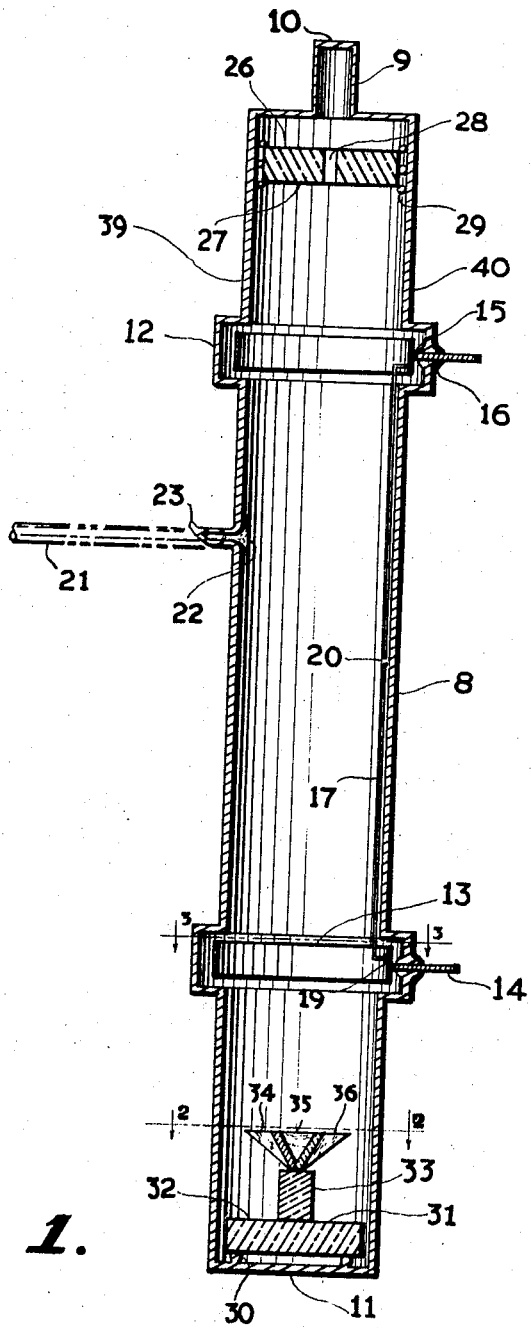
FIG. 1 is a vertical section through the axis of the gas laser tube system showing one arrangement of the components.
Figure 2A:
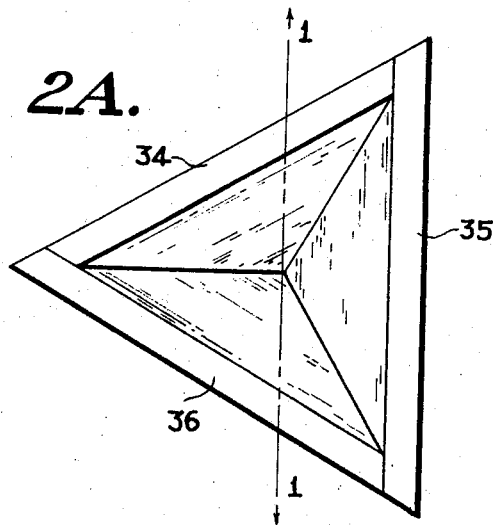
FIGURES 2A and 2B are plan views on line 2—2 of FIGURE 1 and indicates the configuration of the three mutually perpendicular reflector members as grouped and forming a right tetrahedral reflector unit for the gas laser tube system at FIGURE 2A, and a perspective view of the same group drawn at FIGURE 2B.
Figure 2B:
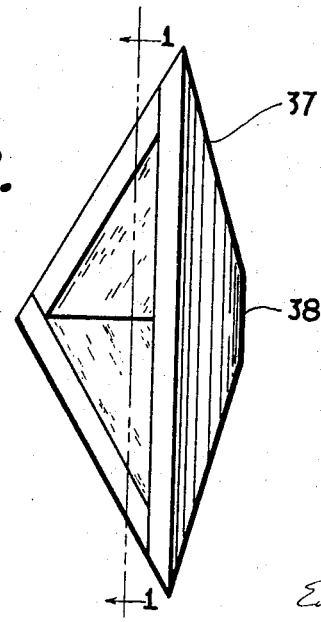
Figures 3A, 3B:
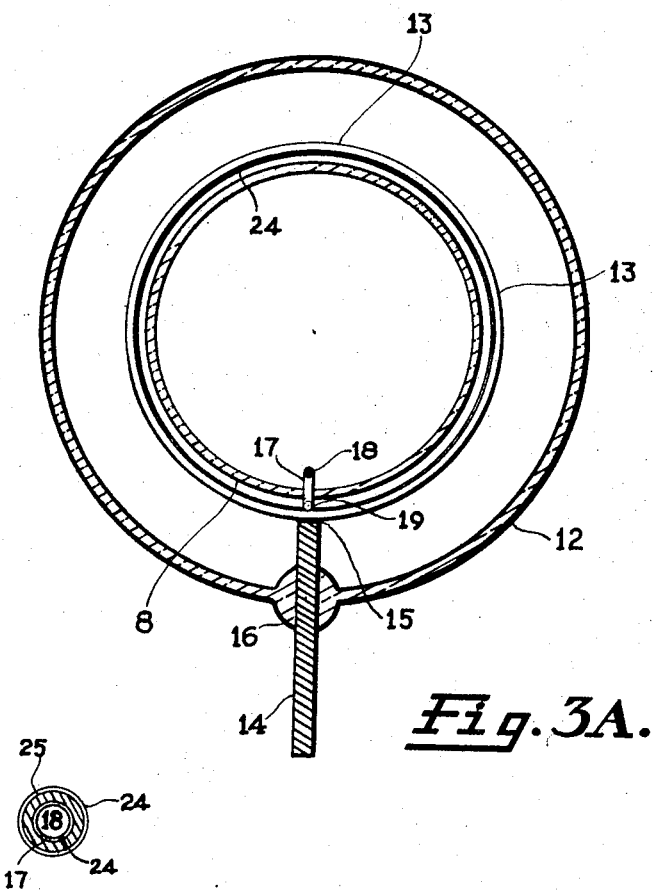
FIGURES 3A and 3B are sectional views on line 3—3 of FIGURE 1 and presents one of the electrode member assembly units used in the gas laser tube system as drawn at FIGURE 3A, and a magnified cross section view of the diminutive micro-tubular electrode starter member as drawn at FIGURE 3B.
Figure 4A:
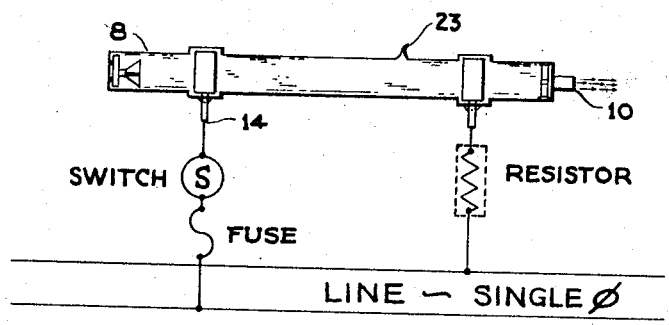
Figure 4B:
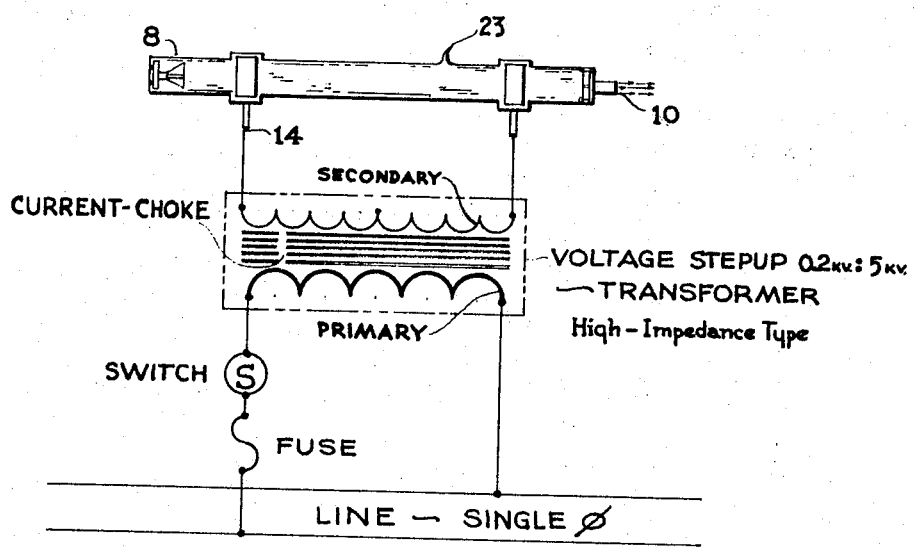
Figure 5A:
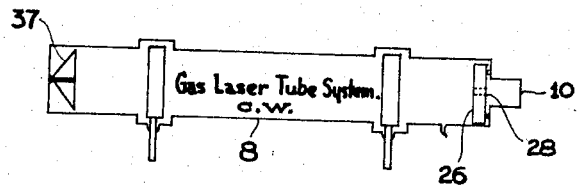
Figure 5B:
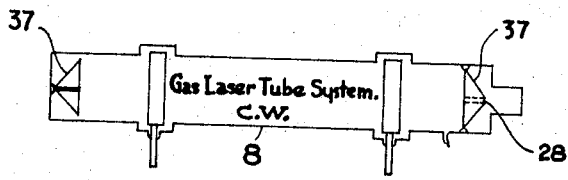
Figure 5C:
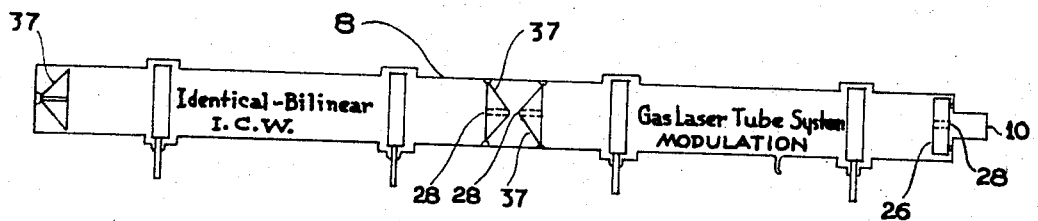
Figure 6:
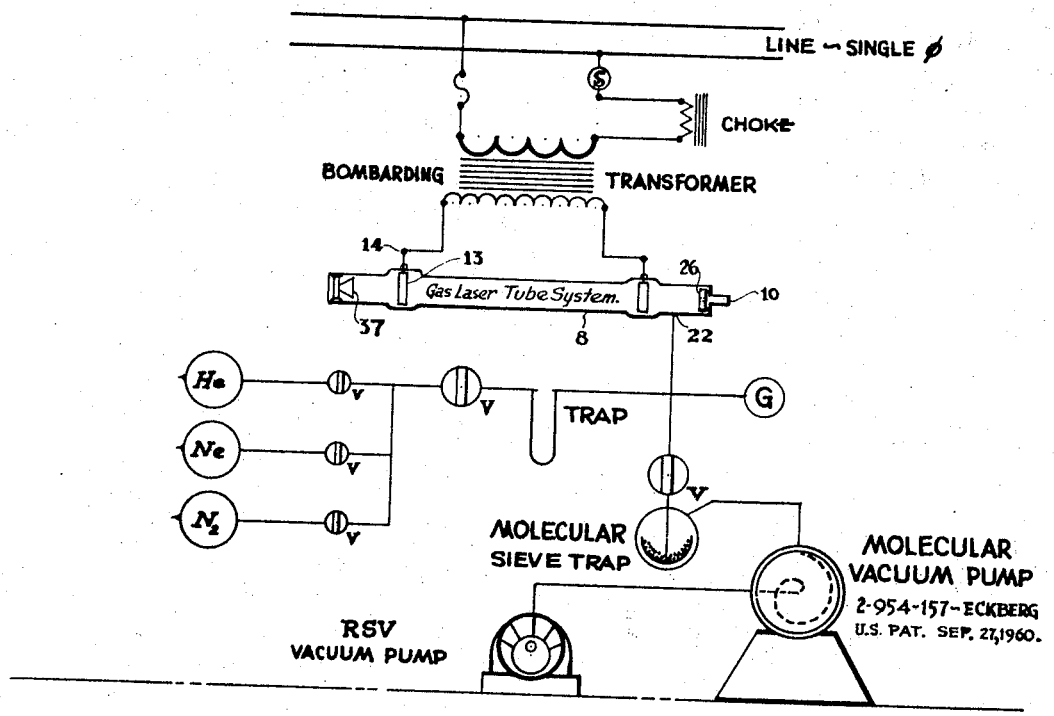

FIGURES 4A and 4B are electrical schematics of the gas laser tube system and the drawing presents and includes: At FIGURE 4A electrical schematic of the gas laser tube system as connected directly to standard line voltages, and at FIGURE 4B electrical schematic of the gas laser tube system as connected, optionally, to a suitable ballast or step-up transformer when certain voltage increases are indicated;

FIGURES 5A, 5B and 5C are outline composite sketch drawings of three feasible arrangements for the components of the gas laser tube system as substitled, in each instance respectively, and FIG. 6 is a one-line drawing of the ideal arrangement of the vacuum apparatus for an effective evacuation, purification, bombardment, and gas mixture filling of the gas laser tube system, a key to the symbols used in this drawing as a part of the drawing.

The gas laser tube system comprises a main body elongated right cylindrical glass tubular member 8 one end of which has an extending coaxial tubular glass member 9 having a relatively smaller diameter than that of the main body tube member 8. The terminal end of the extending coaxial member 9 is provided with an optically flat window disc member, 10, sealed to the end of the extended coaxial tubular member 9 by glassblowing technique. The opposite end of the main body member 8 is closed and sealed at 11. Radially enlarged portions 12 are blown and formed in the main body member 8 at positions that are located as being equidistant from each of the ends, respectively, of the main body tubular member 8. Circularly formed band type electrode members, 13, are provided and positioned within the radially enlarged portions 12. The inside clearance diameter of the electrode members 13 is equal to, or slightly greater than, the inside diameter of the main body tubular member 8. The electrode member 13 is coaxially located and each electrode, respectively, is held in a concentric position in the radially enlarged portions 12, respectively, by pin 14 welded to each electrode member 13 at welding location 15. Each pin member 14 is sealed and beaded to the glass wall of the radially enlarged portions 12 at sealing location 16 by a metal-to-glass seal. Preformed and matched, micro-tubular electrode starter members 17 are provided, matched and paired as to their respective form and length, and one end of each micro-tubular electrode starter member 17, respectively, is welded to each of the circularly formed band type electrode members 13, respectively, at welding location 19. The form and the length of each of the micro-tubular electrode starter members 17 is predetermined so that upon their respective positioning and their respective weld a very minute gap 20 slightly separates the two terminal ends of each, respectively. The micro-tubular electrode starter member 17 may optionally rest, laterally, upon the inside wall of the glass of the main body tubular member 8, but it is advised that they be held in a position slightly above and parallel to the glass wall by the use of small glass beading technique. The physical gap 20 is of an order of a few hundredths of one millimeter, in length. This gap 20 is essential. No electrical or physical contact of a solid-state character can be allowed to exist, as between the two terminal ends of the micro-tubular electrode starter members 17. A glass tubulation member 21 is provided as appended to the main body tubular member 8, and the tubulation member 21 has a flow-rate communication, or a conductance path, to the gas laser tube system through orifice 22, thusly formed by tubulating, in the main body tubular member 8. Tubulation member 21 will later be sealed and tipped-off, at location tip 23, but the tubulation member 21 remains intact and attached, as provided, for both during the glass-blowing assembly and during the vacuum processing and the gas fill of the gas laser tube system. When the gas filling is finally effected, the tubulation member 21 is tipped-off at 23. This tip-off 23 renders the gas laser tube system vacuum tight and gas tight, and ionically operational for laser beam generation. An electron emissive coating 24 is applied to the inner surface of the circularly formed band type electrode members 13, likewise the electron emissive coating 24 is applied to both the bore, 18, and the anterior surface 25, of the micro-tubular electrode members 17. At the one end of the main body tubular member 8 having the coaxially extended tubular member 9, a front surface mirror disc 26 is positioned and placed therein with its front surface mirror side, 27, facing the opposite end of the gas laser tube system, or toward end closure 11 of the main body tubular member 8. The mirror member 26 is positioned in a plane at a perpendicular to axis of the main body tubular member 8, or within a few degrees. Snapring fasteners 29 are provided at the peripheral edge faces of the mirror disc member 26 to hold the latter in position. An optical orifice 28 is provided in the form of a through-hole drilled in the center of front surface mirror disc 26. The size of orifice through-hole 28 is of importance, since it will limit the diameter of the laser beam output as to be generated during full operation of the gas laser tube system upon its completion and use. The optimum diameter for the optical orifice member 28 approximates one-tenth the diameter of the front surface mirror disc member 26. Within the confines of closure 11, at the other end of the main body tubular member 8, small glass beads are provided and used as sealing fasteners to receive glass disc member 31. This glass disc member 31 may (optional) be a front surface mirror reflector member, but this is optional since it is not a requisite to the success of the gas laser tube system in its full operation and use. However, when such front surface reflection is included it assumes its form from a thin-film deposition technique (en vacua) and will be located at face 32 of the glass disc member 31, the deposition metal face 32 facing toward the opposite end of the main body tubular member 8. A solid short glass stud member 33 is sealed to the center of face 32 of the glass disc member 31, directed axially toward the other end of the main body tubular member 8. Three optically flat mirrors having excellent front surface reflector characteristics are now provided: the three respectively are, plano-mirror member 34, plano-mirror member 35, and plano-mirror member 36, respectively. The three plano-mirror, front surface mirror members, 34, 35, and 36, are cut and assembled (over the corner of a true cube form) to form a three-plane mutually-perpendicular tetrahedral reflector group, 37, when they are assembled and bonded together. The front surface of each plano-mirror member faces the interior of the tetrahedral reflector group 37. A portion of the outer vertex of the tetrahedral reflector group, 37, is cut off flat at 38, the anterior vertex flat cut being perpendicular to the true axis of the assembled tetrahedral reflector group 37. Stud member 33 is used, as provided, to receive the tetrahedral reflector group 37, the latter group being fastened and bonded to the stud member 33, by sealing and bonding flat portion 38 of the tetrahedral reflector group, 37, to the end of stud member 33. At some convenient and optionally selected location of the main body tubular member 8, but at a location other than any within the limits of the electrode members 13 and their respective micro-tubular electrode starter members 17, the main body tubular member 8 may be cut into two sections—say, at location 39, in order to better facilitate the assembly of the gas laser tube system components to be placed therein, as outlined in the foregoing; however, if this procedure is followed it will be necessary to reseal the main body tubular member 8 back together, at 40, to effect the gas laser tube systems readiness for its thorough processing, to fully develop the gas laser tube system.

The thorough and effective processing of the gas laser tube system is carried forward as outlined in the following, with some direct references being made to the drawing of FIGURE 6, a part of these specifications:

The gas laser tube system is attached, by glassblowing seal, to the vacuum system apparatus by use of the tubulation member 21. Standard high quality vacuum technique is practiced to produce a state of extreme purity at very low internal pressure, by both the application of external oven heat to the gas laser tube system, and the internal ionic high current bombardment of that portion of the gas laser tube system between electrode members 13. During bombardment the temperature of the electrode members 13 should be brought up to a visible bright-red heat, or approximately $850° +$ C. This is required for the conversion of the electron emissive coating 24. The temperature at the glass tubular portions of the gas laser tube system may be properly raised to about $450°$ C. The oven temperature, generally, which applies to all components that are contained within the main body tubular member 8 of the gas laser tube system, should be held at an ambient $425°$ C. These conditions will fully degas all the components of the gas laser tube system which do not fall within the limits of the aforesaid method of ionic internal bombardment. When low pressures of an order of $5.0 \times 10^{-8}$ Torr (Mercury) are attained, subsequent to the foregoing heat applications of both internal bombing, and over baking, the unit gas laser tube system is allowed to cool down. At an observed and measured temperature somewhat above room (normal) temperature, the gases are admitted and the gas laser tube system unit is sealed, or tipped-off at 23. For very high states of spectroscopic purity of the gases to be admitted for the filling of the gas laser tube system it is essential that some form of trap be used in the gas branch line of the vacuum apparatus; and, for the helium-neon type of gas laser I have used activated charcoal trapping with marked success. Too, for reasons that an evolution of profuse condensable vapors are released during the evacuation and heat purification of the gas laser tube system of this invention, I have made a use of a molecular high vacuum pump. This type of vacuum pump produces dry vapor-free vacua; it is indicated as MVP in FIGURE 6. Should a molecular pump not be available for the processing of the gas laser tube system it will be necessary to include in the apparatus at the location shown in FIGURE 6 as occupied by the molecular vacuum unit, a large volume, high conductance, freeze-out trap unit. This will assist in the removal of the condensable vapors encountered. The bombarding transformer used should be regarded as dangerous, its output far more than that required to electrocute the operator were he to come in contact with either, or both, of the lead wire feed lines runing to the gas laser tube system during actual "ON" of bombardments. The use of a direct vision spectroscope will indicate the state of the purity of the resulting visible gas discharge within the gas laser tube system following its tip-off at 23; the spectroscopic examination being made through the side wall of the main body tubular member, 8, rather than at the window location. Note: One should at all times avoid the direct path of the laser beam output. It might cause severe personal damage.

I have selected boro-silica types of glass for the components of my gas laser tube system, for the greater part. The exceptions are enumerated as follows: The plano window member 10 can be one of numerous suitable materials, the better one for certain wavelength being investigated is indicated in the literature. All of these various materials which may be used vary greatly over a wide range of physical composition; a few being, rock-salt; calcium-fluoride; boro-silica; and, quartz. The last mentioned, quartz, is excellent for both the full visible band of the entire electromagnetic spectrum, and the near infra-red band. Indeed, it also transmits ultra-violet quite effectively. Some of the window materials mentioned above do not allow a seal by fusion to the boro-silica glass, either directly or by graded sealing; calcium fluoride being one of such materials. And, although this material, calcium fluoride, extends into the infra-red region of the electromagnetic spectrum, its use requires some method of cement type bonding to the boro-silica glass of the gas laser tube system. The rock-salt, superior in its characteristics for infra-red transmission, is quite hygroscopic, and looses its optical facial quality under humid conditions. The reflectors and mirrors are of a glass in each instance best suited for grinding and polishing, boro-silica being sometimes used. The electrode material is pure nickel. The micro-tubular electrode starter is of either pure nickel, or of stainless steel. The latter is one material for this diminutive component which lends a rigidity of excellence. The electrode lead pin is pure tungsten, and its weld to the pure nickel of the electrode is better effected in an atmosphere of non-oxidazing nature; "forming gas" being one such gas. (e.g. 90% dry nitrogen+10% hydrogen). The electron emissive coating, available economically, is a mixture of the carbonates of strontium, calcium, and barium, respectively; in proper proportion in a binder solution. The item may be either sprayed or dipped. As outlined in the above, this coating is converted during the bombardment phase of the processing, and this reduces the various carbonates of the coating to their respective oxides; even some of the basic pure metal material. This presents an electrode surface which is unexcelled in so-called cold-cathode discharge. The snapring fasteners which hold the front-surface mirror disc in position are made of piano wire, steel. When two unlike glass components are required to be joined together, they can not be directly fused together by reason of the differences of their respective coefficients of thermal expansion, and unless a graded seal is effected for the junction, some form of cement bonding is used. In the case at hand I used an epoxy bond material which had an extremely low vapor pressure level, at room temperature. In the case of the quartz window, in my case for one prototype, a graded seal was used of the required glasses which lie between the boro-silica and the quartz material—about four steps. Some moderate alignment care may be exercised during the assembly of the components of the gas laser tube system. However, a normal visual sighting-in is close enough; indeed, because of several certain advantages, optically, in the use I have made of the right tetrahedral reflector group in the gas laser tube system, deviations from a perfect alignment may be considered as gross, in the relative sense. It is important, however, that the right tetrahedral reflector group itself be a precision assembly. The mutual perpendicularity of all three plane members of this group must be carried forward with precision or the result can render a plurality of images. When assembled with precision, a single true image results. All mirrored surfaces, of first order, or front surface character are of the finest workmanship with respect to the thin-film metal deposition for the required type of certain metallic reflector required; gold being the better for the red end of the spectrum such as in laser beam generations, and silver or aluminum being more acceptable for the reflection of the entire visible and ultra-violet portions of the spectrum. It is standard technique to use a thin-film of chromium, prior to gold deposition, the chromium improving the adhesion of the gold to the glass of the substrate, or mirror. All thin-film deposition work is "aged" subsequent to the actual vacuum deposition of the metallic film.

As a summary and to bring my specification near its due conclusion it is pertinent that the following remarks be made: Assuming that the helium-neon gas type laser tube typifies the gas type laser tube and, of course, other gas mixtures are used of the present state of the art of gas laser tube devices, we may state that the helium-neon gas type laser tube very critically depends on the extreme close micro-parallelism between its two end-reflector members. This is true in both cases of either the use of two plano-reflector members, or two spherical (confocul) end reflector members. The optical finish on the surfaces must be of an excellent order and be true to within a wavelength, or two, of light; mercury-monochromatic light. When other gases or vapors or combinations of either are used in such a laser tube, these filling gas changes do not in the least modify or lessen the rigid requirements as outlined as to optical excellence of the components used. In any and all cases we may state, also, that the method used for the excitation of the contained gases may be one of several methods; high-frequency, high-voltage, and or a direct current of high voltage character. The requirement is to provide some means to excite the gas to the point of atomic or ionic self-sustaining discharge. With regard to some of the electrical characteristics of the gas laser tube system I have made some compromise in the matter of the life-extent of the unit, on the one hand, while on the other hand I have introduced an improved condition in my device to greatly lower the required excitation voltage drop across the tube unit gas discharge. It has validly been stated, in the prior art, that a gas discharge tube will evidence and demonstrate an increase in its life-extent in the direct order of the square of the gas fill pressure, all else being accepted as being equal. However, since the gas laser is a moderately low pressure device, its filling pressure cannot be appreciably increased in order to accommodate the desire for an increase of its life-extent. Hence, my compromise is to enlarge the bore or the diameter of the cavity tube, thusly introducing additional and reserve molecules of the contained gases to best accomplish, in effect, some increase of the life-extent of the gas laser tube system—at the same filling pressure. Too, the relatively high voltage drop heretofore used, as inherent to the design of the present-day state of the art laser, in my device has been reduced to a normal line voltage range. The micro-tubular electrode starter members with their small "gap" account for and make this reduction in voltage drop possible in my gas laser tube system. (Note: Stated in terms of unit voltage drop; a one foot length of discharge may require several hundred volts, normally, to produce excitation and ionization therein, whereas a one foot length of my gas laser tube system, using the micro-tubular electrode starter members will cause the required voltage drop to decrease to as low as 85 to 95 volts (A.C.). Therefore, my gas laser tube system can be directly connected to standard single-phase line power voltages, and operate and generate the laser beam. A small series connected resistor is indicated to limit the actual operating current within the gas laser tube system.) The time consuming efforts to arrange for and to attain the required true condition of parallelism of the two plano-end-reflectors, or the two confocul spherical-end-reflectors of present-day laser tube devices have resulted, generally speaking, in failure as often as in success. For, even when the required precise parallelism is attained it can soon be "lost" due to both thermal and/or some mechanical shock-stress; first, during the processing of the tube, and later during its full operation. Therefore, several devious forms for an external adjusting for parallelism have been tried. Though most have been successful, they too prove time consuming in actual practice. In my gas laser tube system, a novel and successful optical system is presented and used such that the precise parallelism requirement of the two-end-reflector members is no longer required. My completed and operative gas laser tube system assembly can withstand any and all thermal and mechanical shock-stress—short of solid state breakdown—and continue to function and generate the desired laser beam. Hence, we now have available to the art a gas laser tube which can very safely/successfully be air-borne, or apace-borne, and continue to properly function as a gas laser tube laser beam generator under the conditions of extreme thermal and mechanical shock-stress as imposed to it during flight or orbit. Finally, the following is offered as my own description of the novel right tetrahedral mirror reflector group as used in my gas laser tube system: Three plano-front surface (first order) mirrors are set up and joined together so that they are mutually perpendicular to each other, and meet at a common vertex to form the apex of a right tetrahedron, the fourth face of which is obviously open to the front surface reflector thin film (metal) deposited on all three. The quality of the three plano-mirrors must be excellent, and the mutual perpendicularity of the three must be precise. The fourth open face presents a wide angle field, relatively, for the entrance of light rays from without the system, and these are accepted into the tetrahedral reflector group. The resulting optics are; any photon from any distance or location that falls within the field of the tetrahedral reflector group system which assumes a path that is incident to the tetrahedral reflecting group will always return exactly parallel to its incidence path. During its traverse it will have impinged with and be reflected from all three of the three mutually-perpendicular reflector surfaces of the right tetrahedral reflecting group. Now, since the final direction of this photon—thus far described and discussed—is simply the opposite direction, it follows that the path and the direction of the photon is not, and can not, be changed by any imposed rocking or motion, generally, about the axis of the right tetrahedral reflector group. It is this characteristic for the accommodation of motion, while maintaining a constant optical resultant, that indicated the use of such tetrahedral reflecting group for use in my gas laser tube system. The entire laser might be in a state of moderate vibratory motion, and it could likewise be subjected to a wide and rapid temperature change (ambient), and yet it would receive and reflect in an orderly and constant manner any parallel set of photons, and not disrupt their respective coherent quality. The basic difference between my gas laser tube system and the present state of the art laser device, with respect to laser beam output strength, resides in the fact that my laser system requires a double-traverse through the laser cavity in order that the photon return to its original starting point. This fact may, or may not, affect the frequency characteristic such that a later patent may be applied for when testing is conclusive on the present novelty. This would involve, specifically, the matter of cavity length versus laser beam power output; and wavelength data as resulting from the use of the device of the present invention wherein a plurality of two or more of the devices are adjoined or abutted to form one identical bilinear + modulator single-mode gas laser device of a certain desired and/or predetermined wavelength. Having thus described my invention, that which I wish to secure by Letters Patent is covered in the following claim:

1. A gas laser tube system comprising a main body tubular member having at one of its ends a coaxially extending smaller short tubular member; a window closure at the end of the aforesaid coaxially extending smaller short tubular member as sealed thereto, said window being an optically flat material that transmits both the visible and the infra-red portions of the electromagnetic spectrum; radially extending enlarged portions in the aforesaid main body tubular member; circularly formed band type electrode members coaxially positioned in the aforesaid radially extending enlarged portions; micro-tubular electrode starter members attached to each of the aforesaid circularly formed band type electrode members; a minute gap between the two terminal ends of the aforesaid micro-tubular electrode starter members, said gap not to exceed one-fifth of one millimeter in length; an electron emissive coating applied to the inner surface of the aforesaid circularly formed band type electrode members; an electron emissive coating applied to both the inner and the outer surfaces of the aforesaid micro-tubular electrode starter members; terminal lead-in pin members welded to the aforesaid circularly formed band type electrode members, said pins sealed to the aforesaid radially extending enlarged portions of the aforesaid main body tubular member by a metal-to-glass bead seal; a glass tubulation attached to the aforesaid main body tubular member, said tubulation member having a conductance or flow-rate communication orifice to the said main body tubular member; a seal closure of the aforesaid main body tubular member at its end which is opposite to the aforesaid window member; an optical front surface mirror disc of glass, plano or spherical, positioned coaxially inside of and bonded to the aforesaid closure seal end of the main body tubular member; a short solid cylindrical glass stud member positioned centrally upon the aforesaid optical front surface mirror disc member, and sealed thereto and extending axially toward the other end of the aforesaid main body tubular member having the aforesaid window member; a right tetrahedral first order reflector group of three plano front surface mirrors positioned together as to be mutually perpendicular, the front surface mirror faces of each of the said three plano mirrors facing the inner space of the said tetrahedral reflector group; a flat area at the exterior vertex of the aforesaid right tetrahedral reflector group, said flat area surface sealed and bodned to the extended end of the aforesaid short solid cylindrical glass stud member; an optical front surface mirror disc having a through-hole in its center, positioned inside the aforesaid main body tubular member, coaxially, against the inner end of the said main body tubular member having the aforesaid coaxially extending smaller short tubular member; the aforesaid front surface glass mirror disc having its front surface mirror side facing the other end of the aforesaid main body tubular member; snapring fasteners to hold the aforesaid front surface mirror disc member in proper position; a relatively low absolute gas pressure total of two, or more, gases or vapors—or combinations thereof—admitted into the main body tubular member, and occupying all space therein, said total absolute pressure approximating the optimum gas pressure or vapor pressure of the mixture being utilized, but never more than a few millimeters of mercury pressure, absolute scale, and, the aforesaid gases, or the aforesaid vapors, or the aforesaid combination thereof, sealed into the main body tubular member by tip-off seal of the aforesaid glass tubulation member of the aforesaid gas laser tube system.

References Cited

UNITED STATES PATENTS

| | | | |
|---|---|---|---|
| 3,311,843 | 3/1967 | Friedl | 331—94.5 |
| 3,363,196 | 1/1968 | Eknayan | 331—94.5 |
| 3,388,314 | 6/1968 | Gould | 331—94.5 X |

RONALD L. WIBERT, *Primary Examiner.*

E. BAUER, *Assistant Examiner.*